(12) United States Patent
Dodd

(10) Patent No.: US 8,613,028 B2
(45) Date of Patent: *Dec. 17, 2013

(54) AUDIOVISUAL MULTI-ROOM SUPPORT

(75) Inventor: Kevin Charles Dodd, Basingstoke (GB)

(73) Assignee: Sony Europe Limited, Weybridge (GB)

( * ) Notice: Subject to any disclaimer, the term of this patent is extended or adjusted under 35 U.S.C. 154(b) by 152 days.

This patent is subject to a terminal disclaimer.

(21) Appl. No.: 12/976,299

(22) Filed: Dec. 22, 2010

(65) Prior Publication Data

US 2011/0162017 A1 Jun. 30, 2011

(30) Foreign Application Priority Data

Dec. 31, 2009 (GB) .................................. 0922742.2

(51) Int. Cl.
*H04N 7/18* (2006.01)

(52) U.S. Cl.
USPC ................ 725/78; 725/80; 725/82; 725/114; 725/141

(58) Field of Classification Search
USPC ......................... 725/78, 80, 82, 114–115, 141
See application file for complete search history.

(56) References Cited

U.S. PATENT DOCUMENTS

| | | | |
|---|---|---|---|
| 5,438,423 A | | 8/1995 | Lynch et al. |
| 6,972,680 B2 * | | 12/2005 | Yui et al. ..................... 340/540 |
| 2005/0028208 A1 * | | 2/2005 | Ellis et al. ..................... 725/58 |
| 2005/0097618 A1 | | 5/2005 | Arling et al. |
| 2005/0195848 A1 | | 9/2005 | Braneci et al. |
| 2006/0190559 A1 * | | 8/2006 | Lim ............................ 709/217 |
| 2007/0198682 A1 | | 8/2007 | Pazhyannur et al. |
| 2007/0260697 A1 * | | 11/2007 | Shapiro ........................ 709/212 |
| 2009/0106793 A1 * | | 4/2009 | Tecot et al. ..................... 725/38 |
| 2009/0146779 A1 * | | 6/2009 | Kumar et al. ............... 340/5.31 |
| 2009/0216351 A1 | | 8/2009 | Van Horck et al. |
| 2010/0251297 A1 * | | 9/2010 | Berkoff ........................ 725/39 |

FOREIGN PATENT DOCUMENTS

| | | |
|---|---|---|
| CN | 101129051 A | 2/2008 |
| EP | 1 172 721 A1 | 1/2002 |
| GB | 2 433 398 | 6/2007 |
| WO | WO 2006/090340 A1 | 8/2006 |
| WO | WO 2009/001259 A2 | 12/2008 |

OTHER PUBLICATIONS

U.S. Appl. No. 12/976,339, filed Dec. 22, 2010, Dodd.
United Kingdom Search Report Issued Mar. 18, 2010, in Great Britain Patent Application No. 0922742.2, filed Dec. 31, 2009.
John Ritchie, et al., "UPnP AV Architecture:0.83", for Universal Plug and Play Version 1.0, Preliminary Design, (TPD), Jun. 12, 2002, 22 pages.
Alan Presser, et al., "UPnP Forum", UPnP™ Device Architecture 1.1, Document Revision Date Oct. 15, 2008, 136 pages.
"UPnP Low Power Architecture", For UPnP™ Version 1.0, Design Complete V.92 (TDC), Apr. 4, 2007, 47 pages.

(Continued)

*Primary Examiner* — Mulugeta Mengesha
(74) *Attorney, Agent, or Firm* — Oblon, Spivak, McClelland, Maier & Neustadt, L.L.P.

(57) ABSTRACT

The invention relates to providing audiovisual content on a network, and methods of transferring the audiovisual content between devices attached to the network. The methods involve accepting user input, at a first output device that is outputting audiovisual content, to select a second output device from the output devices associated with the network and subsequently outputting the audiovisual content on the second output device that is selected.

10 Claims, 8 Drawing Sheets

(56) References Cited

OTHER PUBLICATIONS

Shailendra Sinha, et al. "*LowPowerDevice:1*; Service Template Version 1.01", For UPnP™ Version 1.0, Design Complete V.92 (TDC), Mar. 15, 2007, 23 pages.

"Understanding Universal Plug and Play", Microsoft Windows Millennium Edition, Operating System, White Paper, 44 pages.

Combined Office Action and Search Report issued Mar. 29, 2013 in Chinese Application No. 201010624886.9 (With English Translation).

Search Report issued Apr. 5, 2011 in European Application No. EP 10 25 2065.

Search Report issued Apr. 20, 2011 in European Application No. EP 10 25 2066.

Richard Van De Sluis, et al., "User Interface for an In-Home Environment", Human-Computer Interaction INTERACT '01, Edited by Michitaka Hirose, IFIP TC. 13 International Conference on Human-Computer Interaction, Jul. 9-13, 2001, XP008134755, Jul. 9, 2001, pp. 383-390.

\* cited by examiner

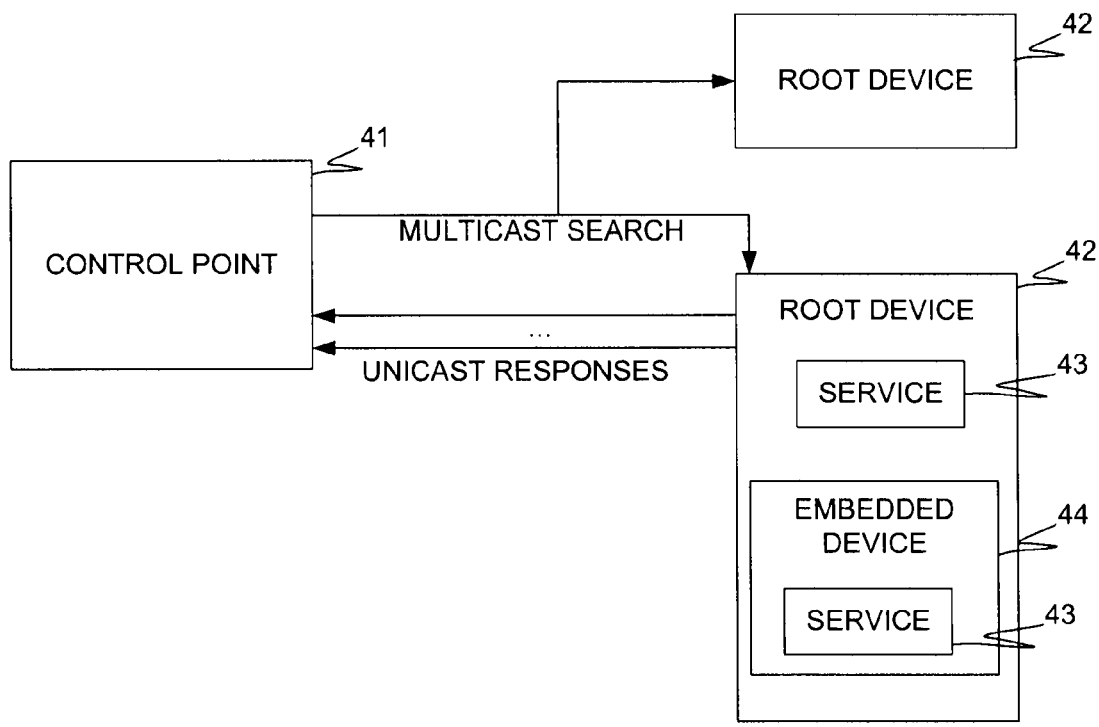
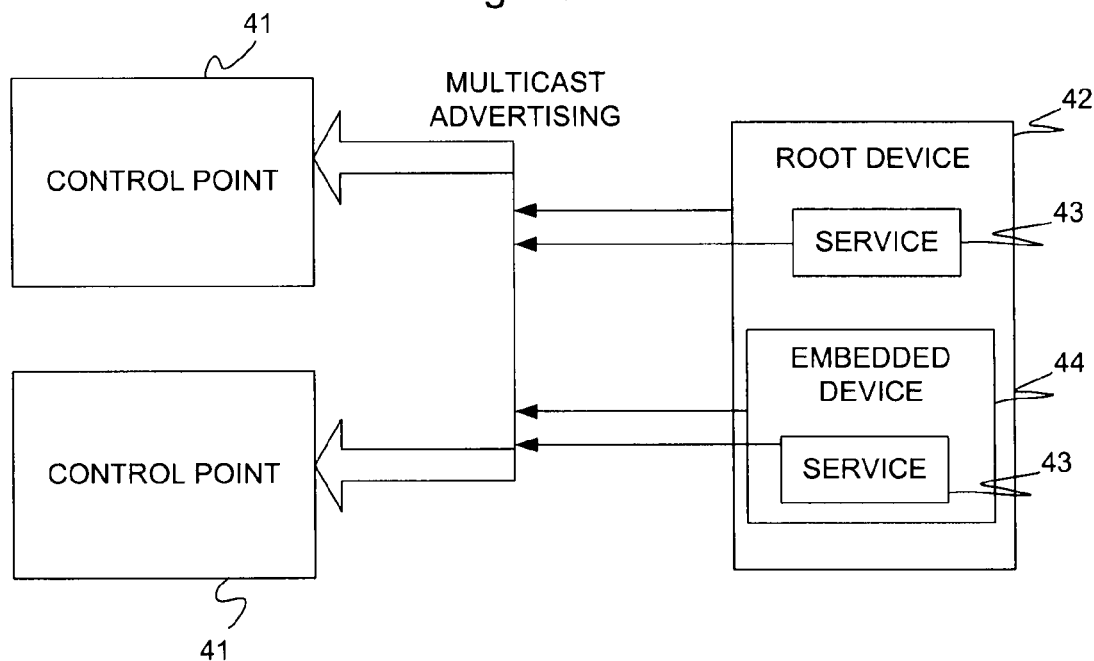

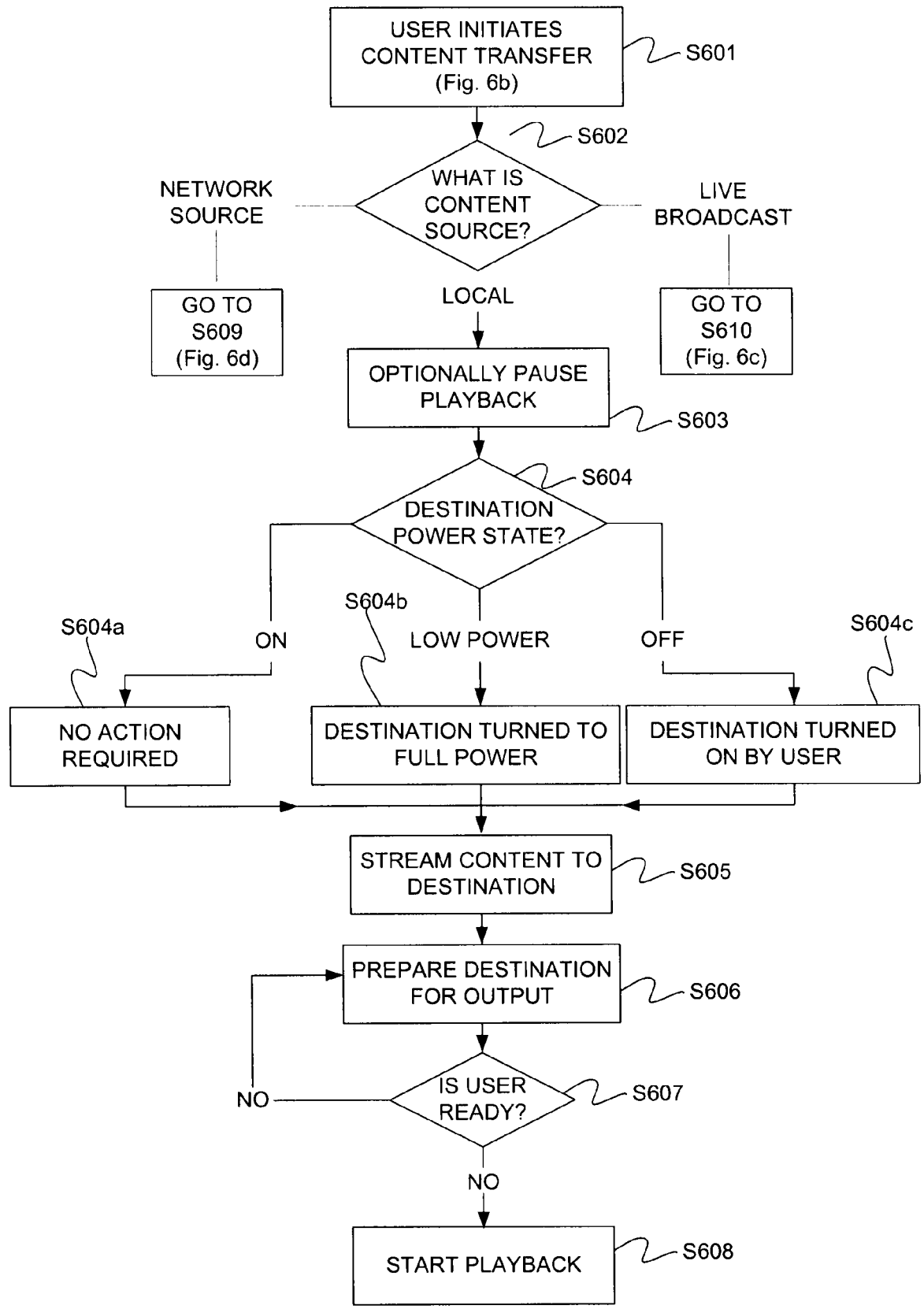

AUDIOVISUAL MULTI-ROOM SUPPORT

CROSS-REFERENCE TO RELATED APPLICATIONS

This application is based upon and claims the benefit of priority from British Application No. 0922742.2 filed 31 Dec. 2009, the entire contents of which are incorporated by reference.

BACKGROUND OF THE INVENTION

1. Field of the Invention

The present invention relates to providing audiovisual content on a network, and methods of transferring the audiovisual content between devices attached to the network.

2. Description of the Related Art

It is now common for people to have access to wide range of audiovisual content. Audiovisual content or media includes, but is not limited to, content such as music, films and television programming. The content may either be available on a form of physical storage media, such as an optical disc or a hard drive, or available 'live' or in 'real time' via broadcasting services such as television, radio, the interne or on-demand services.

As audiovisual content becomes available from more sources and in more formats, it becomes difficult for a user to organise and access the content as freely as they might wish. For example, in a home environment, some content may be stored on a personal computer (a PC) in one room, whilst a hi-fi system capable of playing music may be located in another room and a television for playing broadcast programming may be located in another room. Therefore, a user will have to go to the different rooms to access the different sorts of content.

However, a user may desire to watch a film which is recorded on the hard drive of the PC via the television. For example, the television may provide a larger viewing screen than the PC or simply be in a more convenient location. In such situations, it is desirable to provide a network connecting the various pieces of audiovisual equipment and storage, so that the content at one physical location on the network may be accessed by any appropriate device at any other physical location on the network.

A known way of providing a network is to use the Universal Plug and Play (UPnP) protocol for communicating between devices on the network. Universal Plug and Play (UPnP) extends the simplicity of Device Plug and Play (common in the PC environment) to include the entire network, enabling discovery and control of devices, including networked devices and services, such as network-attached printers, Internet gateways, and consumer electronics equipment. It is designed to support zero-configuration, "invisible" networking, and automatic discovery for a breadth of device categories from a wide range of vendors.

With UPnP, a device can dynamically join a network, obtain an IP address, convey its capabilities, and learn about the presence and capabilities of other devices—all automatically; enabling zero configuration networks. Devices can subsequently communicate with each other directly; thereby further enabling peer to peer networking.

UPnP is an open standard and uses standard TCP/IP and Internet protocols, enabling it to seamlessly fit into existing networks. Because UPnP is a distributed, open network architecture, defined by the protocols used, it is independent of any particular operating system, programming language, or physical medium (just like the Internet). UPnP does not specify the APIs applications will use, allowing operating system vendors to create the APIs that will meet their customer needs.

Building on this platform, the Digital Living Network Alliance (DLNA) standard has been developed, with a specific focus on ensuring compatibility between consumer electronics.

However, although the existing UPnP and DLNA protocols go some way to easing a user's access to audiovisual content on a network, there is still room for improvement.

One problem that a user may face is that they may start viewing or listening to content at one location, and then either be interrupted or simply wish to change location. For example, a user may start watching a film in their living room, but then wish to continue watching the film in their kitchen whilst they prepare dinner. At present, this cannot easily be achieved. If the film is a recording, it may be possible to access the recording from a television in the kitchen, but this requires the user to start playback again in the kitchen, and then locate their playback position in the film. If the film is broadcast content, the user may miss part of the broadcast as they change rooms. Also, if the television device in the kitchen is off, it may take time to re-connect to the network and access the desired content. All of these issues mean that a user's enjoyment of the content is impaired, as it is difficult to transfer content between devices mid-way through content playback.

WO-A-2006/090340 seeks to provide a method for extending the capabilities of UPnP AV network architecture with a "Universal Follow-me" functionality. This functionality allows users to pause or stop playing media content at one location on the network and resume the playing of the media content at a later point in time at a different or the same location without a loss of continuity. However, the method simply stores the playback position in connection with the media content. At the later point in time, the user still has to locate the media he wishes to view. As such, the "follow-me" functionality is mis-named, because the media does not follow the user. Rather, the user has to "summon" the media from the new location. This still leaves a burden on the user to access the media, which is especially annoying if the change in location is not accompanied by a long pause (such as when a user changes rooms).

OBJECTS AND SUMMARY OF THE INVENTION

The present invention aims to at least partly address the above mentioned problems.

According to a first aspect of the invention, there is provided a method of transferring the output of audiovisual content between different output devices associated with a network, the method comprising: accepting user input, at a first output device that is outputting audiovisual content, to select a second output device from the output devices associated with the network; outputting the audiovisual content on the second output device that is selected.

According to this aspect, the invention allows for the transferral of the output of audiovisual content or media across a network, to a location selected by a user from the original output location. This allows a user to 'send' the content to a new location which they intend to move to (for example another room in a house), so that the content will be waiting for them when they arrive. This is advantageous because it avoids the user needing, for example, to either re-tune to a broadcast at the destination or to physically transfer the audiovisual content (for example a DVD) to the new location and then re-locate the playback position at which the playback was interrupted when the user changed locations. Also, the automatic transfer avoids the need for the user to search for and access any information which may be stored on the network in connection with a previous viewing of the content in order to start playback from the interruption point. Instead, the system responds to the user's original input so that when they arrive at the destination the content is awaiting playback from the interruption point.

Preferably, if the selected second output device is an output device that is associated with the network but is turned off, the method further comprises: after the second output device has been selected, detecting when the second output device is turned on by a user; and wherein the step of outputting the audiovisual content on the second output device occurs in response to detecting the second output device being turned on. If the selected second output device is a device which is in a low power mode in which it is not capable of outputting the audiovisual content, the method further comprises: after the second output device has been selected, issuing a signal to the second output device to exit the low power mode and become capable of outputting the audiovisual content; and the second output device, in response to the signal to exit the low power mode, leaving the low power mode and becoming capable of outputting the audiovisual content, the step of outputting the audiovisual content on the second output device occurring thereafter.

According to these embodiments, the invention allows for the transfer of content to devices which are not in a full power state at the time the transfer is initiated by the user. In UPnP networks, devices in a low power or 'sleep' mode remain registered with the network and can be awoken by a message from the network. The present invention uses this functionality to allow the user to transfer the audiovisual content to the device in a low power mode, turning the device on into full power mode, so that playback of the content can begin as soon as possible at the destination. That is, there is no delay because the user has to go to the destination and put the destination device into full power mode. Conventional UPnP networks do not 'remember' devices which have been completely turned off. When a device is turned off, it sends a 'leaving network' message, so that control points on the network remove the device from the network map. This is a problem because it means that the devices cannot be accessed by the network, and therefore transfer of content to the device cannot be arranged. In the present invention, devices which are turned off do not send a 'leaving network' message, so that the device remains on the network map. In some embodiments, the device may send a 'turning off' message to the network, but this only serves to inform the network of the power state of the device, and does not result in the device being removed from the network map. As a result, although communication cannot be established with the device whilst it is off, the network remains 'aware' of the device when it is off, and can therefore schedule transfers of audiovisual content to the device, to occur once the device is turned on. This allows a user to arrange a transfer of audiovisual content from a first device, and for the transfer to be completed by turning on the second, destination, device without having to then perform any further steps to set up communication of the destination device with the first device.

Preferably the method further comprises: ceasing the output of the audiovisual content on the first output device; and the outputting of the audiovisual content on the second output device occurring from the point at which output was ceased on the first output device. This allows for the playback of content at the second output device to be started at the point playback was interrupted on the first device. This avoids the user having to search for the playback position in the audiovisual content at the second device, enabling a smooth transition for the user when switching playback devices.

Preferably, if said audiovisual content is obtained from a source device which is the first output device or a device connected directly thereto, the method further comprises, in response to the user input to select the second output device, transmitting the audiovisual content from the first output device to the second output device. If said audiovisual content is obtained from a source device which is a device connected to the network other than the first output device or the second output device or a device directly connected thereto, the method further comprises: in response to the user input to select the second output device, transmitting the audiovisual content from the source device to the second output device. The source device may comprise a storage unit storing the audiovisual content and/or when said audiovisual content is broadcast content, which is broadcast from a source remote to the network, the source device may comprise at least one tuner for receiving the broadcast content.

According to these embodiments, the transfer of content to the second output device is achieved as efficiently as possible. If the audiovisual content is stored at the first device, the content is transferred across the network from the first device to the second device. Alternatively, if the first device is receiving the content across the network, the communication is changed so that the content is sent from the source device to the second output device, thereby omitting the first device. Possible sources include live broadcasts as well as recorded media. Therefore, it is possible that not all devices for outputting content of the same type will be able to receive the same broadcasts (for example, conventional analogue devices will not be able to receive digital broadcasts). Therefore, it is desirable to be able to transfer content which cannot be received or decoded by a device to that device in a format which it may render.

Preferably, in some embodiments relating to broadcast audiovisual content, transmitting the audiovisual content from the source device to the second output device comprises: transmitting the audiovisual content to a recording unit; recording the audiovisual content, at the recording unit, from the point at which the output of the audiovisual content on the first output device is ceased, to produce recorded audiovisual content; and transmitting the recorded audiovisual content from the recording device to the second output device. The recording unit may be part of the first output device, part of the second output device or part of another device connected to the network. This provides a 'live pause' functionality, allowing a user to transfer broadcast media without missing any of the broadcast when they change locations. The live pause can be achieved using any available storage on the network. It may be preferable to use storage at the destination device or the source device, however these may not always be present/available and in those circumstances other devices connected to the network may be used.

Preferably, the method further comprises: determining which devices associated with the network are suitable for outputting the audiovisual content, and informing the user of the suitable devices, at the first output device, before the user selects the second output device. Further, at least one of the first and second output devices may be a television set, a display screen, a receiver for signals representing audio information, a hi-fi, a computer, a set top box, a media streamer device, a gaming console or a media player. This prevents the user being presented with the option of transferring the audiovisual content to a device on the network which is not capable of outputting the content. This may be achieved by either only informing the user of the suitable devices, or may be achieved by informing the user of all devices associated with the network with an indication of those devices which are suitable for the transfer.

Preferably, the network is a network in accordance with the Universal Plug and Play standard. UPnP networks allow for ease of set-up, which is further enhanced by DLNA. As such UPnP networks are well suited for the home environment. However, the invention may be implemented on any network architecture.

According to another aspect, the invention provides a computer program capable of execution by devices on a network, the computer program being arranged, on execution, to cause the devices to perform a method according to the first aspect.

According to another aspect, the invention provides a storage medium storing a computer program according to the previous aspect.

According to another aspect, the invention provides a system comprising a first output device and a second output device, wherein the first and second output devices are configured to perform the method of the first aspect of the invention.

According to another aspect, the invention provides an output device, associated with a network, for outputting audiovisual content, the output device being configured to transfer the audiovisual content to a second device associated with the network, wherein the output device is configured to delay transferring the content to the second device until it receives a signal indicating the second device is in a power state ready to output the audiovisual content. Optionally, the output device is configured to transfer the audiovisual content in response to user input selecting the second device for transfer of the output of the audiovisual content.

BRIEF DESCRIPTION OF THE DRAWINGS

To aid in the understanding of the invention, the invention is discussed below by way of example, with reference to the accompanying figures, in which:

FIG. 3a is a diagram indicating the messages sent when a control point is added to UPnP network and FIG. 3b is a diagram indicating the messages sent when a device other than a control point is added to a UPnP network;

FIG. 5 is a flow diagram indicating the steps involved when a device on a network according to the present invention is turned off and subsequently turned on;

FIG. 6a is a flow chart indicating the steps involved when transferring audiovisual content stored locally to a first device from the first device to a second device.

DETAILED DESCRIPTION OF THE PREFERRED EMBODIMENTS

Figure 1:
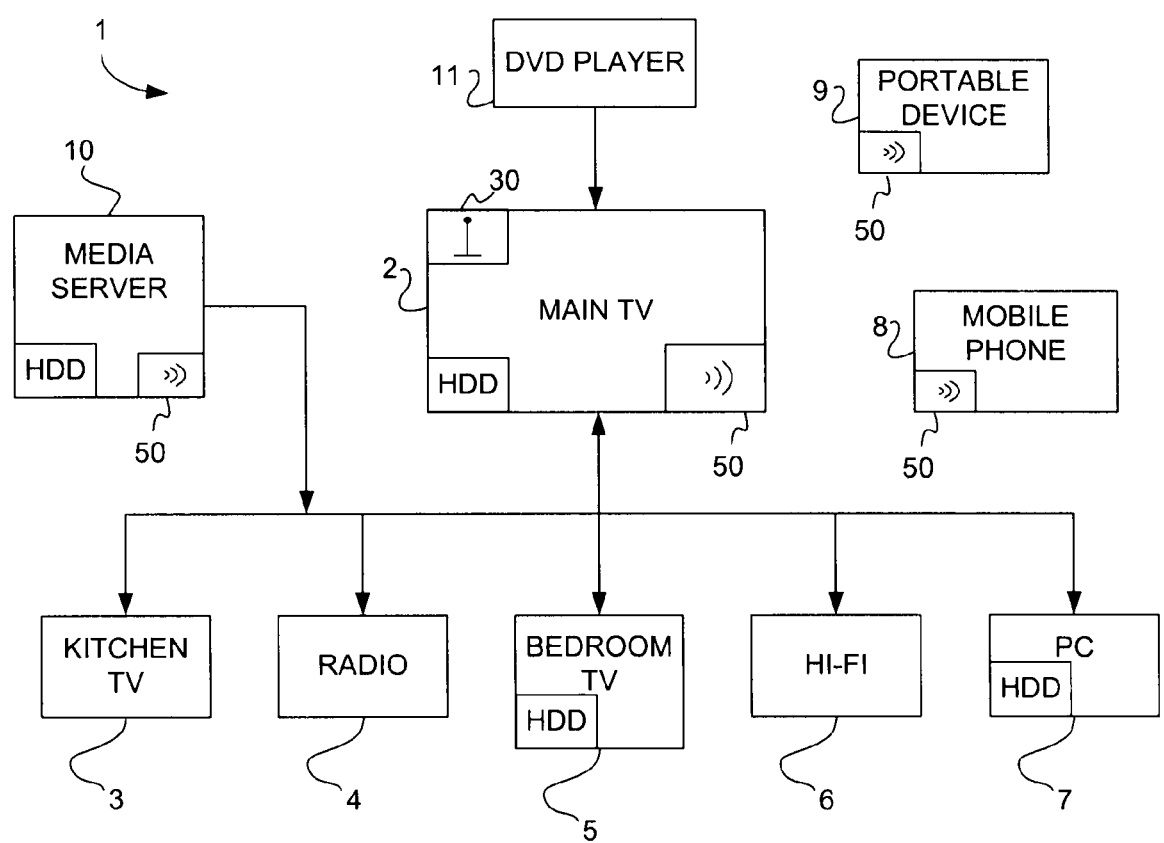
FIG. 1 is a schematic diagram showing a network in accordance with an embodiment of the present invention.

The present invention can be implemented in connection with existing network architectures. Examples of such architectures include UPnP and DNLA.

The following examples are based on UPnP and DNLA networks. Therefore, UPnP and DNLA are discussed below.

UPnP is fully described in the UPnP standards, available from www.upnp.org. Of background relevance to the invention are the documents UPnP Device Architecture 1.1, of 15 Oct. 2008; UPnP AV Architecture 0.83, of 12 Jun. 2002 and UPnP Low Power Architecture, of 4 Apr. 2007. However, the most relevant aspects of UPnP are described below.

The basic building blocks of a UPnP network are devices, services and control points.

A UPnP device is a container of services and nested devices. For instance, a VCR device may consist of a tape or disc transport service, a tuner service, and a clock service. A TV/VCR combination device would consist not just of services, but a nested device as well.

Different categories of UPnP devices will be associated with different sets of services and embedded devices. For instance, services within a VCR will be different to those within a printer. Consequently, different working groups will standardize on the set of services that a particular device type will provide. All of this information is captured in an XML device description document that the device must host. In addition to the set of services, the device description also lists the properties (such as device name and icons) associated with the device.

The smallest unit of control in a UPnP network is a service. A service exposes actions and models its state with state variables. For instance, a clock service could be modelled as having a state variable, "current_time", which defines the state of the clock, and two actions, "set_time" and "get_time", which allow you to control the service. Similar to the device description, this information is part of an XML service description standardized by the UPnP forum. A pointer (URL) to these service descriptions is contained within the device description document. Devices may contain multiple services, as mentioned above.

A service in a UPnP device consists of a state table, a control server and an event server. The state table models the state of the service through state variables and updates them when the state changes. The control server receives action requests (such as set_time), executes them, updates the state table and returns responses. The event server publishes events to interested subscribers anytime the state of the service changes. For instance, a fire alarm service would send an event to interested subscribers when its state changes to "ringing".

A control point in a UPnP network is a controller capable of discovering and controlling other devices. After discovery, a control point could retrieve the device description and get a list of associated services; retrieve service descriptions for interesting services; invoke actions to control the service, and subscribe to the service's event source. Anytime the state of the service changes, the event server will send an event to the control point.

Because it cannot be anticipated what other devices may be on network, and therefore whether a control point will be present, it is expected that devices will incorporate control point functionality (and vice-versa) to enable true peer-to-peer networking.

UPnP provides support for communication between control points and devices. The network media, the TCP/IP protocol suite and HTTP provide basic network connectivity and addressing needed. On top of these open, standard, Internet based protocols, UPnP defines a set of HTTP servers to handle discovery, description, control, events, and presentation. These steps, which are involved in setting up a UPnP network are now briefly discussed.

The foundation for UPnP networking is the TCP/IP protocol suite and the key to this suite is addressing. Each device must have a Dynamic Host Configuration Protocol (DHCP) client and search for a DHCP server when the device is first connected to the network. If a DHCP server is available, the device must use the IP address assigned to it. If no DHCP server is available, the device must use Auto IP to get an address. Auto IP defines how a device intelligently chooses an IP address from a set of reserved private addresses, and is able to move easily between managed and unmanaged networks.

Once devices are attached to the network and addressed appropriately, discovery can take place. Discovery is handled by the Simple Service Discovery Protocol (SSDP). When a device is added to the network, SSDP allows that device to advertise its services to control points on the network. When a control point is added to the network, SSDP allows that control point to search for devices of interest on the network.

The exchange in both cases is a discovery message containing a few important specifics about the device or one of its services, for example its type, identifier, and a pointer to its XML device description document.

The next step in UPnP networking is description. After a control point has discovered a device, the control point still knows very little about the device. For the control point to learn more about the device and its capabilities, or to interact with the device, the control point must retrieve the device's description from the URL provided by the device in the discovery message.

Devices may contain other, logical devices and services. The UPnP description for a device is expressed in XML and includes vendor-specific, manufacturer information including the model name and number, serial number, manufacturer name, URLs to vendor-specific Web sites, and so forth. The description also includes a list of any embedded devices or services, as well as URLs for control, eventing, and presentation.

After a control point has retrieved a description of the device, the control point has the basic information for device control. To learn more about the service, a control point must retrieve a detailed UPnP description for each service. The description for a service is also expressed in XML and includes a list of the commands, or actions, the service responds to, and parameters or arguments, for each action. The description for a service also includes a list of variables; these variables model the state of the service at run time, and are described in terms of their data type, range, and event characteristics.

To control a device, a control point sends an action request to a device's service. To do this, a control point sends a suitable control message to the control URL for the service (provided in the device description). Control messages are also expressed in XML. In response to the control message, the service returns action specific values or fault codes.

A UPnP description for a service includes a list of actions the service responds to and a list of variables that model the state of the service at run time. The service publishes updates when these variables change, and a control point may subscribe to receive this information.

The service publishes updates by sending event messages. Event messages contain the names of one of more state variables and the current value of those variables. These messages are also expressed in XML. A special initial event message is sent when a control point first subscribes; this event message contains the names and values for all evented variables and allows the subscriber to initialize its model of the state of the service. To support multiple control points, all subscribers are sent all event messages, subscribers receive event messages for all evented variables, and event messages are sent no matter why the state variable changed (in response to an action request or due to a state change).

If a device has a URL for presentation, then the control point can retrieve a page from this URL, load the page into a browser, and depending on the capabilities of the page, allow a user to control the device and/or view device status. The degree to which each of these can be accomplished depends on the specific capabilities of the presentation page and device.

In summary, UPnP has several advantages for creating networks. It is based on wire protocols (just like the Internet), not APIs, allowing it to be truly media and platform agnostic. It is based on existing standards, making interoperability easy to accomplish. It has been well adopted, and so has huge industry momentum. Also while being standards based, UPnP is at the same time flexible and able to meet the needs of today's and the future's networked devices.

DLNA allows for the transfer of audiovisual content between DLNA enabled devices, thereby making it easier for a user to access content as they wish.

Media management and control in DLNA enables devices and applications to identify, manage, and distribute media content across, for example, a stationary home network, or to transfer media to mobile devices. UPnP Audio/Video (AV) technology addresses all of these needs for the home network and is the media management and control solution for devices developed according to the DLNA Networked Device Interoperability Guidelines.

UPnP AV specifications define the interaction model between UPnP AV devices and associated control point applications. The UPnP AV architecture allows devices to support entertainment content in any format and over any transfer protocol. UPnP AV specifications define the following four services hosted by Media Servers and Media Renderers:

Content Directory Service: This enumerates the available content (e.g., videos, music and pictures).

Connection Manager Service: This determines how the content can be transferred from Media Server to Media Renderer devices.

AV Transport Service: This controls the flow of the content (e.g., play, stop, pause and seek).

Rendering Control Service: This controls how the content is played (such as volume/mute and brightness).

FIG. 1 shows an example of a network which may be constructed based upon UPnP and DLNA protocols. FIG. 1 shows the network schematically, and does not distinguish between any audiovisual (AV) and network links, which may be provided separately. The network comprises a series of output devices associated with the network 1. The term "output devices" is used to describe devices which can render audiovisual content or media such as video or sound content which may be recorded or broadcast. As such, the present application uses the term "output" to refer to rendering audiovisual content to be appreciated by a user, rather than transmitting the content across a network.

The various output devices depicted in FIG. 1 are given by way of example only are not limiting upon the invention. The devices of the example are chosen to illustrate the various ways in which the present invention may work. The devices may be interchangeable or replaced by alternative devices. In the depicted example, there is included a main television set 2, which may be located in the living room of a house. The main television 2 is equipped with a hard disk drive HDD on which audiovisual content may be recorded and stored. Although the following examples in the present specification will consistently refer to hard disk drives as recording destinations, this is not limiting upon the invention. Optical disk recorders, or devices that record to memory devices such as semiconductor memory may be used as alternatives to the hard disk drives. Where described, such as in the main television 2, the hard disk may also be a memory device, and may be removable and connectable by a bus such as USB or be provided with any other suitable interface allowing attachment/detachment. Using suitable adaptors, Common Interface, CI+ or CableCard slots could be used.

The main television also has a tuner 30 for receiving broadcast audiovisual content. The main television 2 may connect to the network 1 using wireless or wired technology. For example, television 2 is equipped with a wireless communication module 50. Any form of wireless communication may be used.

Further, the main television 2 is directly connected to a DVD player 11. The term "directly connected" means that the DVD player is connected to the television without communication between the main television 2 and the DVD player 11 going via the intermediary of the network 1. In contrast, the main television 2 is connected to other output devices only indirectly, via the network 1.

Other output devices connected to the network 1 include a kitchen television 3, a radio 4, a bedroom television 5, a hi-fi system 6 and a computer 7. The televisions 2, 3, 5 and computer 7 may all be capable of outputting both audio and visual content. In contrast, the radio 4 and the hi-fi 6 may only be able to output audio content. For the purposes of illustration, in the present embodiment bedroom television 5 is provided with a hard disk drive HDD, whilst kitchen television 3, radio 4 and hi-fi 6 do not have a hard disk drive. However, the invention imposes no particular limitation on the capabilities or functionality of any of the output devices.

FIG. 1 also shows mobile phone 8 and portable device 9, which may be a portable media player or games console or the like. These devices may connect to the network 1, either wirelessly (as shown in FIG. 1) or via a wired connection, but may spend much time unable to communicate with the network 1 because they are out of range for the wireless communication.

A media server 10 is also connected to network 1. The media server 10 is not an output device in the sense discussed above. The media server provides a storage location on the network 2. As such, media server 10 is provided with a hard drive HDD, which will commonly be of a much larger capacity than that present in any of the output devices 2-9.

As already mentioned, the network 1 of FIG. 1 may be implemented based upon the UPNP and DLNA protocols. As such, any or all of the devices connected to network 1 may be a UPnP control point. The designation of a particular device as a control point is not essential to the present invention.

Figure 2:
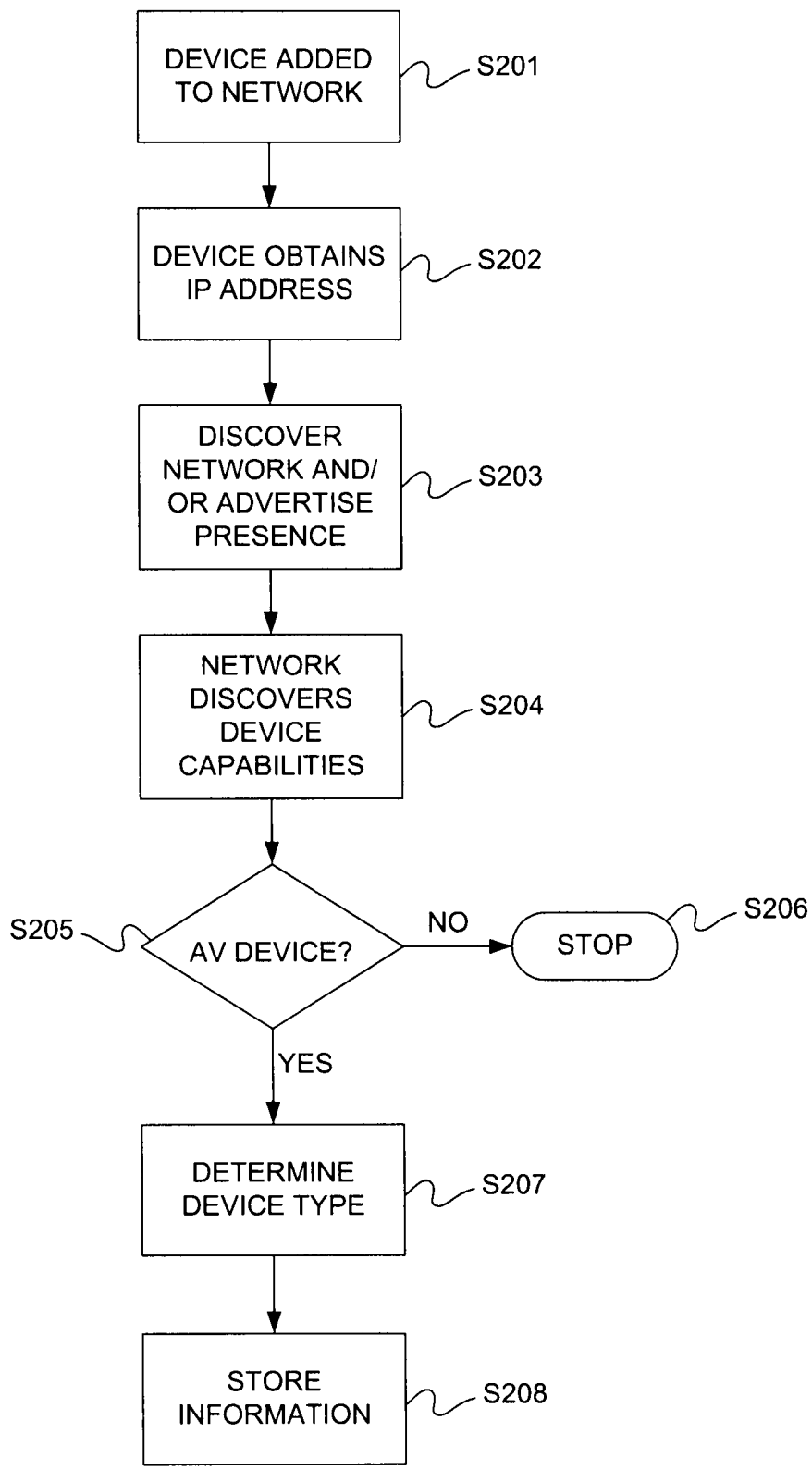
FIG. 2 is a flow diagram showing the steps involved when a new device is added to a UPnP network.

The setting up and addition of devices to network 1 will now be considered with reference to FIG. 2. FIG. 2 shows a flow chart representing the steps performed when a new device is added to network 1. When first setting up a new network 1, it may be necessary to ensure that all devices on the network 1 are turned on to enable all the control points on the network to identify all the devices on the network according to the method of FIG. 2.

At step S201 a new device is added to network 1. As previously discussed, the device is assigned an IP address by a DHCP server or uses auto-IP to get an IP address at step S202.

The next step performed depends upon the nature of the device. The device may be a dedicated control point 41, or may not be a control point or may be a device 42 with an embedded device 44 which may be a control point 41.

At step S203, in order to discover devices on the network 1, a control point joining the network 1 automatically multicasts a search message to the network 1. This message requests existing devices 42 on the network 1 to automatically respond to this search message, identifying themselves to the control point 41 via a unicast response. This is depicted in FIG. 3a, which shows a control point 41 sending a multicast search message to devices 42 which are present on the network.

If, at step S203, the device is not a control point 41, the new device 42 entering the network 1 automatically multicasts a message to the network 1 advertising itself and any embedded devices 44 and services 43. This is shown in FIG. 3b.

If the device 42 entering the network 1 has an embedded control point 41 it will automatically send both the discovery and advertising messages in S203.

Next, in step S204, a new control point 41 retrieves descriptions of devices 42 and their capabilities (i.e. any services 43) from the devices 42 on the network 1. In contrast, if the new device being added to the network is not a control point, existing control points 41 receive the broadcast advertising message from step S203. The description of the devices and their capabilities has been previously discussed, however in the context of the present invention it is preferable that the low power capabilities of the devices 42 are communicated to the control point 41.

The low power capabilites of the devices 42 relate to whether a device 42 supports and/or differentiates between "low power" and "turned off" states. "Standby" or "low power" or "sleep" state can be considered to be any state which requires current to be drawn to maintain it that state and in particular to maintain it in a state of readiness to perform an action, for example:

maintaining a remote control signal receiver active so that it can react to a wireless command to start up
  maintaining a "wake on LAN" status which allows a device 42 to be turned on remotely in response to a remote command from a connected wired network or possibly a wireless network
  maintaining a status which enables faster start up by keeping some, but not all, components powered up.

"Turned off" or "shutdown" state can be considered as a state drawing "zero watts" plus any "no load losses" resulting from the device 42 being plugged into mains electricity, such as current drawn by the coils of a transformer.

A "Hibernate" state in which all settings of the previous powered on state are stored in static memory and then reused on start up to enable a faster start up falls within the definition of a turned off state since the maintenance of the hibernate state requires no power to maintain it.

Next, at step S205, the control points 41 automatically determine whether a device 42 is an audiovisual device. If the device 42 is not an audiovisual device, for the purposes of the present invention, the device 42 is of no interest, and the method shown in FIG. 2 comes to an end at step S206.

If the device 42 is an audiovisual device, the method moves to step S207, in which it is determined by the control points 41 if the device 42 is a media server or a media renderer. Media servers either store or decode audiovisual content to be output. Media renderers output audiovisual content to be enjoyed by a user. Once again, a root device 42 may contain embedded devices 44, and therefore incorporate both media server and media renderer elements. In step S208, the device information is automatically stored by the control points 41 and the method comes to an end.

Next, it will be considered how the network 1 responds to a change in the power state of one of the devices 2-10 connected to the network 1. As will be discussed below, it is desired that audiovisual content output by one of the devices 2-9, may be transferred to another device 2-9. In order to do this, it may be preferable that a first output device can identify all available output devices, even if they are in a low power mode or off.

Figure 4:
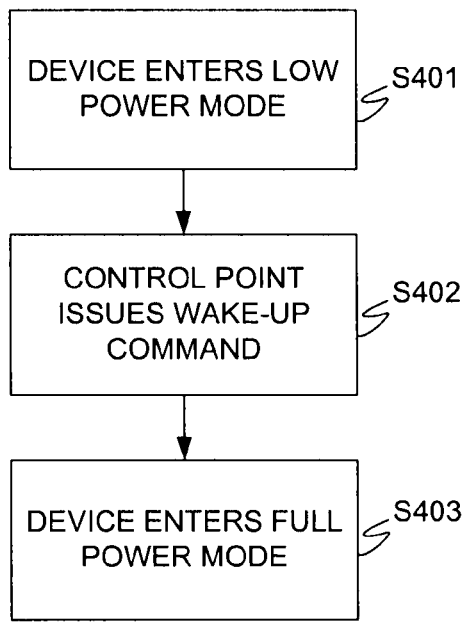
FIG. 4 is a flow diagram indicating the steps which occur when a device on a network according to the present invention enters and subsequently is awoken from a low power mode.

FIG. 4 shows a flow diagram for a device 42 entering a low power or standby mode. According to the UPnP low power architecture a device 42 on a UPnP network 1 may enter a standby mode and subsequently be awoken by a command from a control point 41 on the network 1. FIG. 4 represents this schematically.

At step S401 a device enters a standby or low power mode, this may occur automatically, for example after a predetermined period of inactivity, or may be the result of a user action to place into a low power mode.

At step S402, a control point 41 automatically issues a command to wake the device up, perhaps in response to an instruction elsewhere on the network 1 to output audiovisual content using the device 42.

At step S403, in response to receiving the wake-up command, the device 42 automatically wakes up and moves into an active or full power state.

As will be understood from this description, when a device 42 enters a standby mode, the network 1 remains aware of the device, so that it is possible to issue the wake-up command. In contrast, in conventional UPnP networks, when a device 42 is turned off the network 1 expects to receive a "leaving network message" from the device 42. This ensures that the network 1 remains efficient, by allowing control points 41 to "forget" devices 42 which have left the network 1. However, in some embodiments of the present invention, it is preferable for a network 1 to remember the devices 42 which have been present on the network 1 and have subsequently been turned off. As will be explained in more detail later, this allows a control point 41 to redirect the output of audiovisual content to a device 42 which has been turned off, even though that device 42 is not visible to the network 1 whilst it is in its "power off" state. As will be discussed in more detail later, this is preferable to allow the maximum flexibility about how to redirect audiovisual content.

Figure 5:
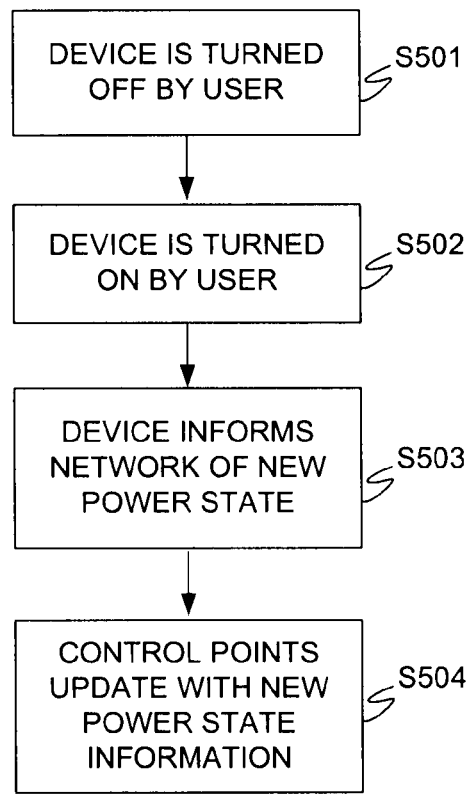

FIG. 5 shows a schematic flow chart representing the steps involved in a device 42, which is a part of the network 1, being turned off and then subsequently turned back on again.

At step S501, the device 42 powers down. For example, this could be achieved by a user pressing a power button on a device. In a conventional UPnP network, the device would send a "leaving network" message to the network 1 at this step. However, according to the present invention, no such message is sent. The result of not sending such a message is that the control points behave as if the device is still present on the network 1. Alternatively, the invention allows for a custom message to be sent to the network 1, indicating that the device 42 is being turned off, but that the device 42 should be maintained on the network map.

Subsequently, at step S502 the device 42 is powered back on, for example by a user pressing the power button again. At step S503 the device 42 automatically informs any control points 41 on the network 1 that it is now powered on. Step S503 may occur even if no custom message has been sent to the network 1 when the device 42 powered down. In that case, the device 42 may power on in a different power state to that which it previously had when it was last connected to the network 1. For example, a device 42 may have been in a low power mode when it was turned off. Then, when the device is turned back on the device 42 may enter full power mode. Therefore, it is preferable for the network 1 to be notified of the power state of the device 42 when the device 42 is turned back on.

At step S504 any control points 41 on the network 1 receive the message regarding the power state of the device 42, and automatically update their databases with the relevant information.

In the method shown in FIG. 5, the control points 41 store information about a device 42 which has left the network 1, even when the device is not present on the network 1. It may be that once a device 42 leaves the network 1 that it will never return to the network 1. For example, the device 42 may be broken. In that case, it is preferable that the databases of the control points 41 may be manually editable (for example, via a user interface provided on one of the output devices 42) to remove obsolete devices 42, and therefore to maintain network efficiency. The operation of the transfer of audiovisual content between output devices 2-9 on the network 1 will now be discussed. However, due to the various possibilities regarding the power states of the destination output devices 2-9, the source of the audiovisual content and the capabilities of the devices 2-10 on the network 1, various scenarios are considered. The scenarios will be described with reference to the embodiment of FIG. 1 and the flow chart of FIGS. 6a-d. FIGS. 6a-d show flow diagrams representing various possibilities for the transfer of audiovisual content from a first output device to a second output device within the scope of the present invention. In the following examples, the specific devices referred to, particularly the main television 2 and the kitchen television 3, when describing the transfer of content are not limiting, and are used by way of example only to illustrate the different scenarios regarding the source signal and recording capabilities.

In the first scenario, the first output device is main television 2, and the audiovisual content is a file located on hard disk drive HDD embedded within main television 2. However, in terms of the method of transferring the content, this scenario is similar to the case of an external device directly connected to main television 2, such as DVD player 11, being the source of the audiovisual content.

According to this embodiment, at step S601 of FIG. 6a a user activates the transfer of the audiovisual content. For example, the main television 2 may be located in a living room and the user may wish to continue watching the film in the kitchen. The user may activate the transfer by interacting with the main television 2 using a button on a remote control, or any other suitable means.

Figure 6B:
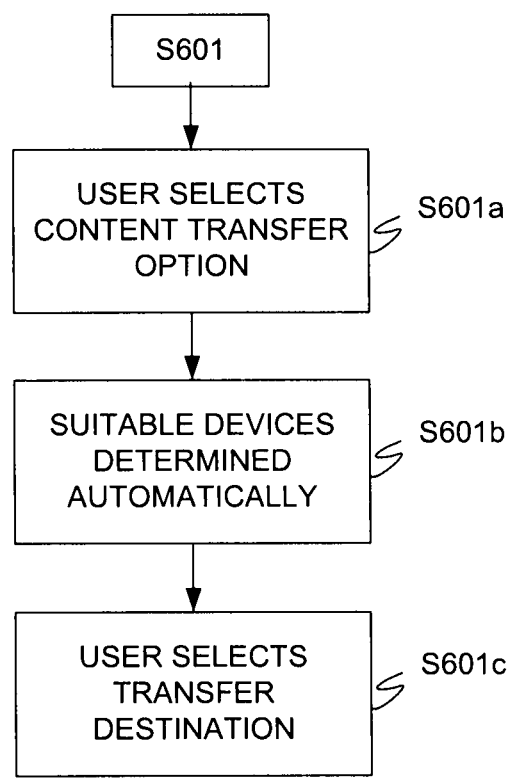
FIG. 6b is a flow diagram indicating the steps involved when a user initiates content transfer in accordance with the present invention.
Figure 6C:
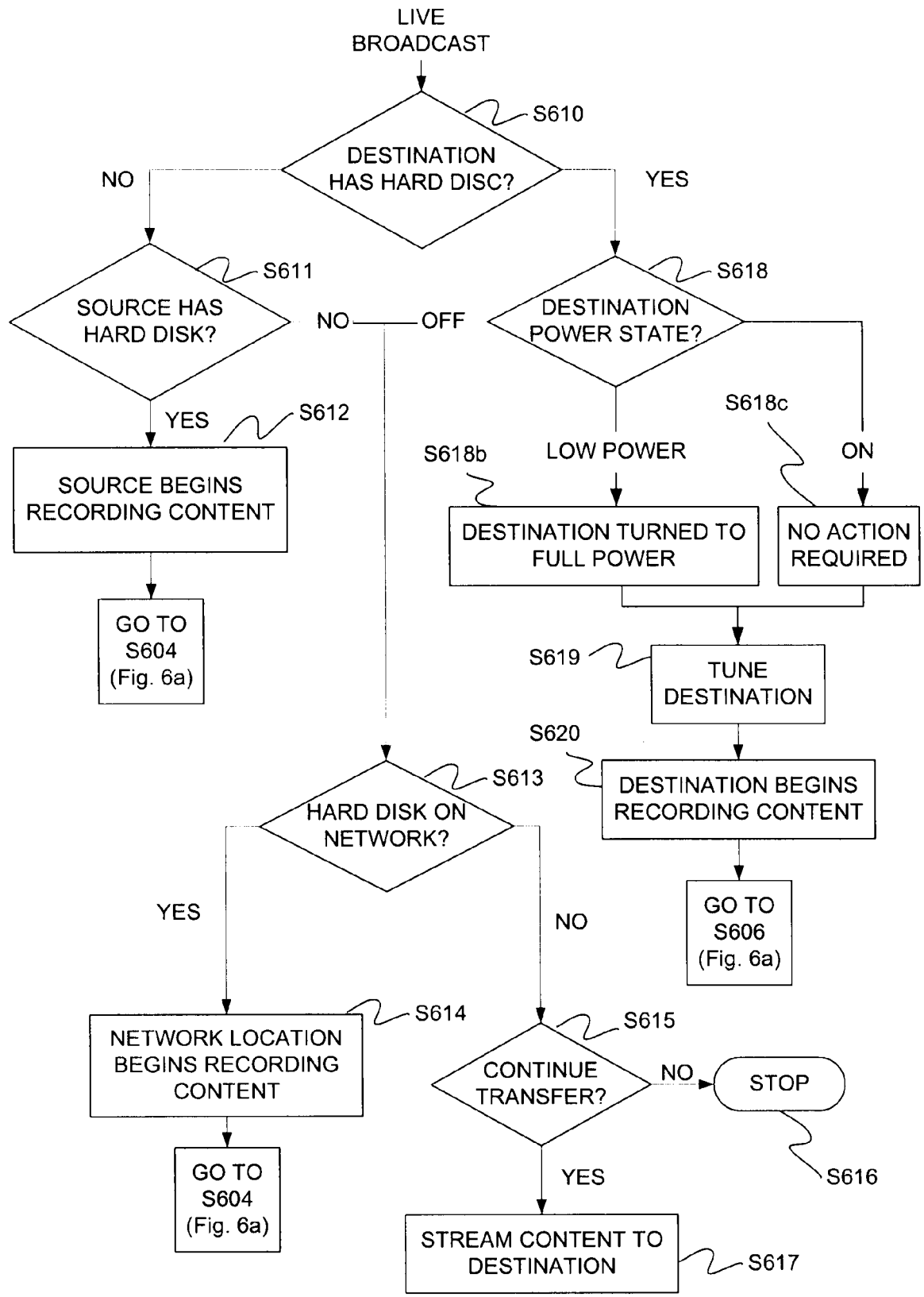
FIG. 6c is a flow chart indicating the steps involved when transferring live broadcast content from a first device to a second device according to the present invention and FIG. 6d is a flow chart indicating steps involved when transferring content output from a first location to a second location according to the present invention, when the source of the content is not the first location or the second location.

As shown in FIG. 6b, step S601 comprises a series of some sub-steps. At step S601a, the user selects the option to transfer the audiovisual content. At step S601b, a control point 41 on the network receives the request for audiovisual content transfer, and automatically determines which devices 3-9 on the network are suitable for transferring the audiovisual content presently being output by main television 2 and presents the user with a choice of devices to transfer the audiovisual content to. This choice may be presented via a menu or overlay on main television 2.

In the present scenario, a film is being output by main television 2, and therefore radio 4 and hi-fi 6 may be judged by the control point 41 to be unsuitable for outputting film content. In some embodiments, a S601*b*, the user may not be provided with the information that radio 4 and hi-fi 6 are connected to the network in S602. In other embodiments, the devices may be made known to the user, but they may not be selectable transferring the audiovisual content.

At step S601*c* the user selects a device to which to transfer the audiovisual content 2. The precise manner of the interaction of the user with the network during this selection is not important. For example, an output device with a display may provide a menu to the user which lists the available devices. In contrast, a device without a visual display may be provided with pre-defined buttons for transferring the audio content to other devices (which may be configured through interaction with a control point, for example).

In any event, at the completion of step S601 the destination for the audiovisual content has been determined. For the purposes of the scenario, the kitchen television 3 is selected by the user at S601.

At steps S602, the source of the audiovisual content is automatically determined by a control point 41 on the network 1. As already noted, in the present embodiment the source of the audiovisual content is the hard disk HDD which is local to the main television 2. Therefore, the method of FIG. 6 progresses to step S603.

In step S603 the playback of the content on the main television 2 is optionally paused automatically, in response to a command from the control point 41. In some embodiments, it may be preferable to pause the playback of the content as soon as the user selects to transfer the audiovisual content at step S601*a*. However, in some embodiments the content may continue to be played (for example in a sub-window on a television display) until the destination device is selected. In any case, in this scenario, because the audiovisual content is pre-recorded, it is possible to pause the playback of the content. At this point, the user may leave the room in which the main television 2 is located, as no further action will be required by the user at this location.

In some instances it may not be desirable to pause playback, as another user may continue to watch the film on main television 2. In that case, the control point 41 automatically notes the "interruption point" for the user who is changing locations.

At step S604 the control point 41 automatically determines the power state of the selected destination device. In the present case, the destination device is the kitchen television 3. There are three options for the possible power state of the kitchen television 3.

First, the kitchen television may be on and in a full power state. In this case (S604*a*) the method proceeds to step S605 without the need for further action.

Second, the kitchen television may be powered on, but in a low power or sleep mode. In this case (S604*b*) it is necessary for a control point 41 to automatically wake the kitchen television 3 following steps S402 and S403 shown in FIG. 4 and discussed previously. The method then proceeds to step S605.

Third, the kitchen television 3 may be fully powered off. In this case (S604*c*) it is necessary for the device to be turned on by the user and for the method steps S502-S504 shown in FIG. 5 to be performed. In this case, the method is interrupted until the user can turn on the destination device. Thereafter, once the steps S502-S504 have been completed, the method moves to step S605.

At step S605, the control point 41 automatically arranges for the audiovisual content to be streamed via the network 1 from the main television 2 to the kitchen television 3. This step involves arranging the network communication necessary for the audiovisual content to be output at the kitchen television 3. However, playback of the audiovisual content at the kitchen television 3 is not started.

At step S406, the audiovisual content is automatically prepared for output on the kitchen television 3 by the control point 41 and the television 3. The film may be displayed on the kitchen television 3 at the point at which it was paused (or the 'interruption point') in step S603. Alternatively, in the case of pre-recorded content, it may be preferable to display the content on the audiovisual content on the kitchen television 3 at a playback position which is earlier by a predetermined amount than the point at which the audiovisual content was paused in step S603. This is because a user may prefer to re-view a certain amount of the playback in order to refresh their memory, for example if there has been a long pause between viewing the film at the main television 2 and re-starting playback at the kitchen television 3.

At step S607 it is determined whether a user is ready for playback to begin. This step may be achieved in many ways, but will usually involve awaiting some form of signal from the user for playback to begin. As a result, as long as the user is not ready, the playback of the audiovisual content is not resumed.

Once the user indicates that they are ready, the method proceeds to step S608, at which the film is automatically output by the kitchen television 3 from the point at which it was paused on the main television 2.

In another scenario, the audiovisual content being output by the main television 2 is live broadcast content which is received directly by the main television 2 via tuner 30.

In this scenario, the user performs the same steps in S601 as in the previous scenario. However, at step S602, the audiovisual content is determined to be broadcast content, and the method moves to step S610 shown in FIG. 6*c*.

In the case of live broadcasts, it is preferable for the invention to provide a live pause functionality. A live pause allows the use of a recording device to time-shift live broadcast content without necessarily performing a permanent recording. This allows a user to stop viewing a broadcast, and return a short time later, without missing any of the broadcast. Live pause functionality is achieved by recording the broadcast from the point at which the user stops viewing the broadcast. Then, when a user wishes to resume viewing the broadcast, the recording is played from the beginning whilst the broadcast continues to be recorded.

Preferably, the hard disk at the output device which the audiovisual content is being transferred to is utilised for this function. However, this may not be possible because the device does not have a hard disk, or it is in use for another operation. In that case, another hard disk connected to the network (i.e. in another output device or on a media server) may be used instead. Clearly, if there are no available hard disks on the network, the live pause functionality cannot be provided.

Therefore, at step S610, it is automatically determined by a control point 41 whether the destination output device, i.e. the kitchen television 3 has a hard drive to provide a live pause functionality.

In the present embodiment, kitchen television 3 does not have a hard disk, so it is necessary to make use of another hard disk attached to the network 1 in order to allow for a live pause of the broadcast content.

Therefore, at step S610, it is automatically determined that kitchen television 3 does not have a hard disk, so the method proceeds to step S611.

At step S611, it is automatically determined by the control point 41 whether the source device from which the live broadcast audiovisual content is being provided to the user as a hard drive to provide the live pause functionality. In the present embodiment, the source device is the main television 2 which does have a hard drive HDD. Therefore, the method proceeds to step S612, at which the source device begins to record the broadcast audiovisual content. Optionally, the playback on television 2 may also be paused at this point. However, this is not essential, and indeed may not be desirable if another person wishes to continue watching playback on the main television 2, as discussed previously.

The method then moves to step S604 and continues in the same way as in the first scenario considered above. It is noted that at step S605, in the present scenario, the streaming of the audiovisual content is the streaming of the content which has been recorded on the hard drive HDD of the main television 2.

If, in another embodiment, at step S611 it is determined by the control point 41 that the main television does not have a hard drive (or that the hard drive was unavailable for use) the method proceeds to S613 in which the control point 41 automatically searches for an alternative hard disk HDD on the network 1. For example, the media server 10 might be used to record the live broadcast and thereby provide the live pause functionality. Once a suitable hard disk HDD is discovered, the method moves to step S614 to automatically record the content at the hard disk HDD and then to step S604, as discussed above. In this alternative embodiment, the step of streaming the data at S605 would occur between the media server 10 and the kitchen television 3.

If at step S613 no available hard disks are found, the method moves to step S615, in which a user confirms whether they wish to transfer the content without the live pause functionality. The user may not wish to miss the film and may therefore choose not to change locations, if so, at step S615, the method is stopped. Alternatively, if the user still wishes to transfer the audiovisual content, without the live pause functionality, the method moves to step S617 at which, the content is streamed to the destination output device (i.e. kitchen television 3) and playback is started. Step S617 may optionally also comprise steps for bringing the destination output device into full power mode, as required.

In an alternative embodiment or scenario, the destination output device may have its own hard drive. For example, the user may wish to transfer audiovisual content from the main television 2 to bedroom television 5. Bedroom television 5 has a hard disk HDD.

In this scenario, at step S610, it is automatically determined by the control point 41 that the destination bedroom television 5 has a hard disk HD, and the method moves to step S618. S618 is an equivalent step of S604, in which the power stage of the destination device is determined. If the device is on or in a low power mode step S618a and S618b are proceeded to respectively, before the method moves to step S619.

However, if the destination is off, it will be desirable to record at another location. This is because, if the destination device is not able to record until it is turned on by the user, the live pause function becomes redundant. In this case the method proceeds to step S613 and continues, as previously described, with a control point 41 automatically searching for another hard disk HDD. Assuming the destination device is on or in a local power mode, the method moves to step S619, at which the destination device is turned to the correct channel to receive the broadcast. In the event that the destination device is not equipped to receive the broadcast signal directly, the broadcast signal may be streamed to the destination device across the network 1 from any suitable device which can access the broadcast signal.

The method then moves to step S620, at which the hard disk HDD of bedroom television 5 automatically begins to record the broadcast signal to provide the live pause functionality. The method then moves to step S606, as in the first scenario, at which the bedroom television 5 is prepared to output the content, for example displaying the first frame of the data which has been recorded. The method then proceeds to step S606 and continues as in the first scenario.

In another scenario, the audiovisual content originally being output by the main television 2, may be stored at a remote location, such as the media server 10. In this case, the audio visual content is being streamed from the media server 10 to the main television 2 where it is output.

In this scenario, if a user wishes to transfer the output of the audiovisual content to another location such as the kitchen television 3, they perform the same actions in step S601 as in the previous scenarios.

Figure 6D:
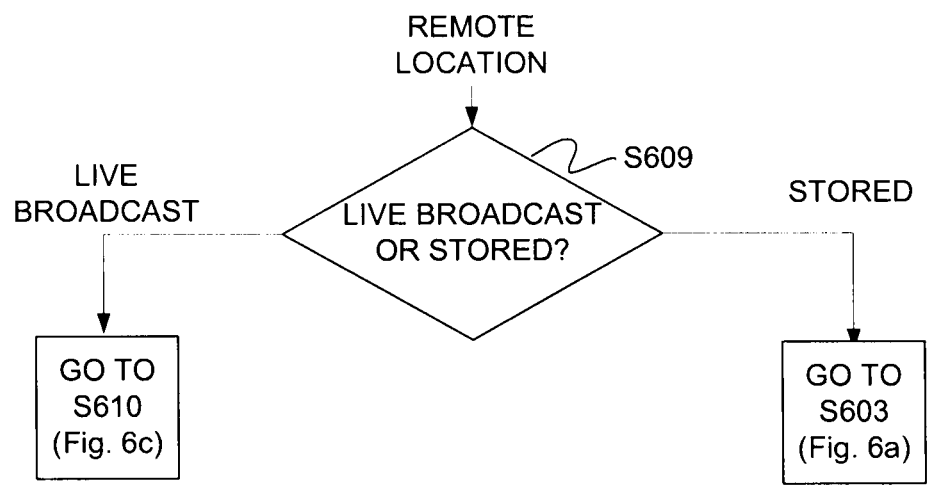

However, at step S602, the source of the audiovisual content is determined by the control point 41 to be the external media server 10, and so the method proceeds to step S609, shown in FIG. 6d.

At step S609 it is automatically determined by the control point 41 whether the audiovisual content is recorded content or is a live broadcast. In the present scenario, the media server stores recorded content on the hard disk HDD, and it is determined that the audiovisual content is recorded content. In this case, the method proceeds to step S603 (FIG. 6a) and continues as described for a "local" source. That is, playback of the content is optionally paused on the main television 2 in step S603, the power status of the kitchen television 3 is determined in step S604, and the kitchen television 3 is woken up if necessary, before a control point re-directs the audiovisual content to be played back via the kitchen television 3.

However, in other scenarios, the main television 2 may be outputting audiovisual content which is a live broadcast transmitted to it from another external source, for example another television which is connected to receive cable broadcasts (which the main television 2 cannot receive directly). These cable broadcasts may be made available to the main television 2 across the network 1. In those scenarios, at step S609, it is automatically determined by the control point 41 that the audiovisual content is a live broadcast, and the method proceeds to step S610.

As will be understood from the foregoing description, the present invention covers many scenarios, depending upon the equipment provided on the network. However, in all scenarios, the network is managed in order to allow the content which the audiovisual content which is being output to a user at a first location to be transferred to a second location which is selected by the user. Further, the transfer can be managed irrespective of the power state of the output device at the second location.

As discussed, the selection of the second location may be performed using a device such as a remote control to select from a menu on the first output device where the audiovisual content should be transferred to. However, other methods of selecting the transfer are also conceivable within the scope of the invention. For example, the output devices may respond to cameras or motion detectors in order to detect when a user leaves or enters a particular room. In such a configuration, audiovisual content could be transferred automatically from a room a user leaves to the next room that a user enters. When using cameras, face recognition technology could be used in order to identify the movements of specific users.

I claim:

1. A method of transferring an output of audiovisual content to different output devices in a local network, the method comprising:
   accepting user input, at a first output device that is outputting audiovisual content, to select a second output device from the output devices in the local network, wherein the selected second output device is in the local network but is turned off;
   responsive to the selection of the second output device, receiving at the second output device the audiovisual content from a source device and not from the first output device, the source device being a device external to the local network and different from the first output device, the second output device, and a device in the local network directly connected to the first or second output devices;
   after the second output device has been selected, detecting when the second output device is turned on by a user;
   outputting the audiovisual content on the second output device in response to said detecting the second output device being turned on; and
   transmitting the audiovisual content from the source device to the second output device, said transmitting including:
   transmitting the audiovisual content to recording circuitry associated with the second output device, and recording the audiovisual content, in the recording circuitry, from a point at which the output of the audiovisual content on the first output device is ceased, to produce recorded audiovisual content.

2. The method according to claim 1, wherein the method further comprises:
   ceasing output of the audiovisual content on the first output device; and
   the outputting of the audiovisual content on the second output device occurring from a point at which the output of the audiovisual content was ceased on the first output device.

3. The method according to claim 1,
   wherein the source device comprises storage circuitry configured to store the audiovisual content.

4. The method according to claim 1,
   wherein the audiovisual content is broadcast content.

5. The method according to claim 1, further comprising:
   determining which output devices associated with the local network are suitable to output the audiovisual content, and
   informing the user of the suitable output devices, at the first output device, before the user selects the second output device.

6. The method according to claim 1,
   wherein at least one of the first and second output devices is a television set, a display screen, a receiver to receive signals representing audio information, a hi-fi device, a computer, a set top box, a media streamer device, a gaming console, or a media player.

7. The method according to claim 1,
   wherein the local network is a network in accordance with the Universal Plug and Play standard.

8. A non-transitory computer-readable storage medium storing a computer program that, upon execution by a processor, causes performance of a method according to claim 1.

9. A system to transfer an output of audiovisual content to different output devices associated with a local network, the system comprising a first output device and a second output device in the local network, wherein:
   the system is configured to
   accept at the first output device, whilst the first output device is outputting audiovisual content, user input to select a second output device from the output devices in the local network, wherein the selected second output device is in the local network but is turned off;
   receive at the second output device, responsive to the selection of the second output device, the audiovisual content from a source device and not from the first output device, the source device being a device external to the local network and different from the first output device, the second output device, and a device of the local network directly connected to the first or second output devices;
   detect, after the second output device has been selected, when the second output device is turned on by a user; and
   output at the second output device the audiovisual content after the selection at the first output device and in response to the second output device being turned on,
   wherein the receiving the audiovisual content at the second output device from the source device is based on transmitting the audiovisual content from the source device, which includes transmitting the audiovisual content to recording circuitry associated with the second output device, and recording the audiovisual content, in the recording circuitry, from a point at which output of the audiovisual content on the first output device is ceased, to produce recorded audiovisual content.

10. An output device in a local network, that provides visual and audible output based on received audiovisual content, the output device being configured to receive the audiovisual content from a source device external to the local network and different from the output device, another output device in the local network, and a device in the local network directly connected to the output device or the another output device,
    wherein the audiovisual content is received based on an input of a user at the another output device selecting the output device,
    the receipt of the audiovisual content is delayed until the output device sends a signal indicating a power state ready thereof to output the audiovisual content,
    the audiovisual content is received from the external source device and is based on the external source device transmitting the audiovisual content from the external source device to the output device, and
    the transmitting from the external source device including transmitting the audiovisual content to recording circuitry associated with the output device, and recording the audiovisual content, in the recording circuitry, from a point at which output of corresponding audiovisual content on the another output device is ceased, to produce recorded audiovisual content.

* * * * *